(12) United States Patent
Chen

(10) Patent No.: US 12,447,602 B2
(45) Date of Patent: Oct. 21, 2025

(54) TOOL BAG STRUCTURE HAVING FASTENER

(71) Applicant: HOMER HARDWARE INC., Changhua (TW)

(72) Inventor: Chung-Li Chen, Changhua (TW)

(73) Assignee: HOMER HARDWARE INC., Changhua (TW)

( * ) Notice: Subject to any disclaimer, the term of this patent is extended or adjusted under 35 U.S.C. 154(b) by 42 days.

(21) Appl. No.: 18/611,205

(22) Filed: Mar. 20, 2024

(65) Prior Publication Data

US 2024/0326233 A1  Oct. 3, 2024

(30) Foreign Application Priority Data

Mar. 31, 2023  (TW) .................................. 112112638

(51) Int. Cl.
  *B25H 3/02* (2006.01)
  *A45F 5/00* (2006.01)
  *A45F 5/02* (2006.01)

(52) U.S. Cl.
  CPC ............. *B25H 3/022* (2013.01); *A45F 5/021* (2013.01); *A45F 5/1575* (2025.01)

(58) Field of Classification Search
  CPC ........ B25H 3/022; A45F 5/021; A45F 5/1575; A45F 5/02; A45F 5/00
  USPC .......................... 206/372; 224/666, 268, 269
  See application file for complete search history.

(56) References Cited

U.S. PATENT DOCUMENTS

| | | | |
|---|---|---|---|
| 6,955,279 B1* | 10/2005 | Mudd ....................... | A45F 5/02 224/269 |
| 9,551,367 B1* | 1/2017 | Shieh ....................... | A45F 5/021 |
| 2005/0072822 A1* | 4/2005 | Stotts ........................ | A45F 5/02 224/269 |
| 2010/0200628 A1* | 8/2010 | Tages ....................... | A45F 5/02 224/269 |

* cited by examiner

*Primary Examiner* — Orlando E Aviles
*Assistant Examiner* — Sanjidul Islam

(57) ABSTRACT

A tool bag structure having a fastener includes a fastener, fastener accessory, and tool bag. The back of the fastener extends and bends to form an n-shaped penetrating-fitting portion by sheet-metal forming technique. The top surface of the penetrating-fitting portion is parallel to or higher than the top surface of the fastener body. The penetrating-fitting portion has a free end that curves upward to form a pressing-through portion, allowing an enclosed penetrating-fitting slot to be formed between the penetrating-fitting portion and fastener body and adapted to contain a band penetrating-fitting. Each of two edges of the penetrating-fitting portion is concave to define a guiding slot. The fastener accessory is inserted into and fitted to an insertion hole disposed at the bottom of the fastener. A user presses the fastener to separate the fastener and fastener accessory quickly, allowing the fastener accessory and tool bag to be fitted together for containing tools.

7 Claims, 23 Drawing Sheets

TOOL BAG STRUCTURE HAVING FASTENER

FIELD

The disclosure relates to a tool bag structure having a fastener, and more particularly to a tool bag structure having a fastener not only suitable for use with a band of any sizes but also capable of being quickly fitted to the band.

BACKGROUND

In daily life, bands, such as belts and waist belts, are for use with dress pants and work pants. Servicemen and servicewomen wear S waist belts around their waists. Sometimes workers fasten tool bags to waist belts which they are wearing in order to carry tools and use the tools whenever necessary. However, the tool bags fastened to the bands are difficult to unfasten. To make the unfastening process easy, the workers have to remove the bands from the tool bags and then adjust the bands. Furthermore, it is necessary to adjust a tool bag fastening mechanism before the bands are completely unfastened with a view to avoiding a waste of working time and enhancing working efficiency. To this end, prior art provides a fastener that functions as a pivot to be coupled to a tool bag and then coupled to the band, allowing the tool bag to be fastened to or unfastened from the band quickly.

However, there is still room for improvement in the prior art. It is important to couple together a band and a fastener as quickly as possible in order to further enhance the fitting process efficiency. Furthermore, the structure of the fastener has to be further adjusted in order to be applicable to different dimensions and types of bands, to enhance the fitting process efficiency, and to meet user needs better.

Therefore, it is imperative to provide a tool bag structure having a fastener not only suitable for use with a band of any sizes but also capable of being quickly fitted to the band.

SUMMARY

The Issue to Address

The issue to be addressed by the disclosure is to provide a tool bag structure having a fastener not only suitable for use with a band of any sizes but also capable of being quickly fitted to the band with a view to overcoming the aforesaid drawbacks of the prior art.

Technical Features Required to Address the Issue

The disclosure provides a tool bag structure having a fastener, comprising a fastener, a fastener accessory and a tool bag. The fastener has a fastener body. The back of the fastener body extends and bends to form an n-shaped penetrating-fitting portion through a sheet metal forming technique. The top surface of the penetrating-fitting portion is parallel to or higher than the top surface of the fastener body. The penetrating-fitting portion has a free end curving upward to form a pressing-through portion, allowing an enclosed penetrating-fitting slot to be formed between the penetrating-fitting portion and the fastener body. Each of two edges of the penetrating-fitting portion is concave to define a guiding slot. A band is penetratingly fitted to the penetrating-fitting slot of the fastener. The front surface of the fastener body is fitted to a front cover for masking the top surface and the front side of the fastener body. The front of the front cover is higher than the back of the front cover. A compression prevention hole penetrates the front cover. A downward-pressing element is disposed at the bottom of the front cover. The surface of the downward-pressing element abuts against the bottom of the compression prevention hole. The edge of the downward-pressing element extends to form at least one downward-pressing tab. A snap-latching portion is disposed at the bottom of the fastener body. A resilient portion is disposed between the snap-latching portion and the fastener body and adapted to resiliently push and cause the snap-latching portion to abut against the downward-pressing tab. The surface of the snap-latching portion is elevated to form a snap-latching protrusion. A gap is defined between the bottom of the fastener body and the bottom of the front cover to form an insertion hole for insertion. The fastener accessory has a fitting portion. The fitting portion is centrally provided with a fitting hole. The fitting portion extends to form a snap-latching tab. The snap-latching tab has a snap-latching hole. The snap-latching tab is inserted into the fastener via the insertion hole to push the snap-latching portion, and thus the snap-latching protrusion is snap-engaged inside the snap-latching hole, allowing the fastener and the fastener accessory to be fitted together. The tool bag has a tool bag body. The tool bag body has a plurality of containing units for containing tools. The upper edge of the tool bag body extends to form a coupling edge. The fitting hole and the fitting portion form an enclosed ring-shaped structure. The coupling edge (32) is passed through the fitting hole (211) and folded so as to be coupled to the back surface of the tool bag body (31), allowing the fastener accessory (20) and the tool bag (30) to be fitted together.

The first objective of the disclosure is as follows: The band is moved from the fastener laterally and inserted into the penetrating-fitting slot. The band may also be inserted into the gap between the pressing-through portion and the fastener body to press the fastener downward and thus cause the penetrating-fitting portion to be temporarily bent outward, allowing the band to enter the penetrating-fitting slot. Therefore, a user can fit the band and the fastener together easily.

The second objective of the disclosure is as follows: Since each of two edges of the penetrating-fitting portion is concave to define a guiding slot, the band can be easily inserted into the penetrating-fitting slot laterally while its insertion into the penetrating-fitting slot is being guided by the guiding slot. Therefore, the user can fit the band and the fastener together easily.

The third objective of the disclosure is as follows: Since the back of the fastener body extends and bends to form the n-shaped penetrating-fitting portion through a sheet metal forming technique, the top surface of the penetrating-fitting portion is parallel to or higher than the top surface of the fastener body, allowing the penetrating-fitting slot to be adjusted in terms of its height and size to contain the band of different widths so as to meet user needs better.

Other objectives, advantages and novelty of the disclosure are depicted with drawings and described below.

DETAILED DESCRIPTION

Figure 1:
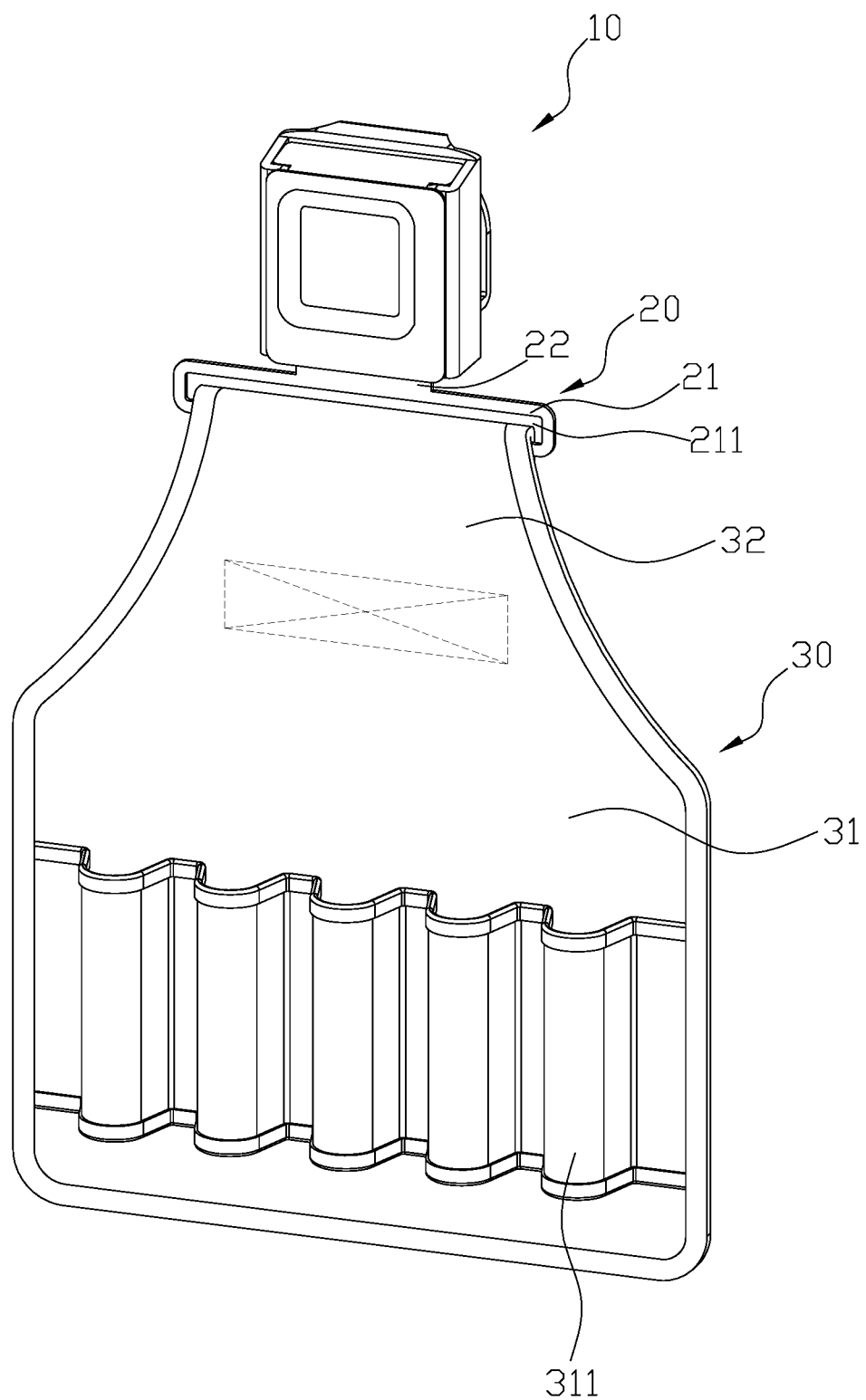
FIG. 1 is a perspective view of a tool bag structure having a fastener of the disclosure.
Figure 2:
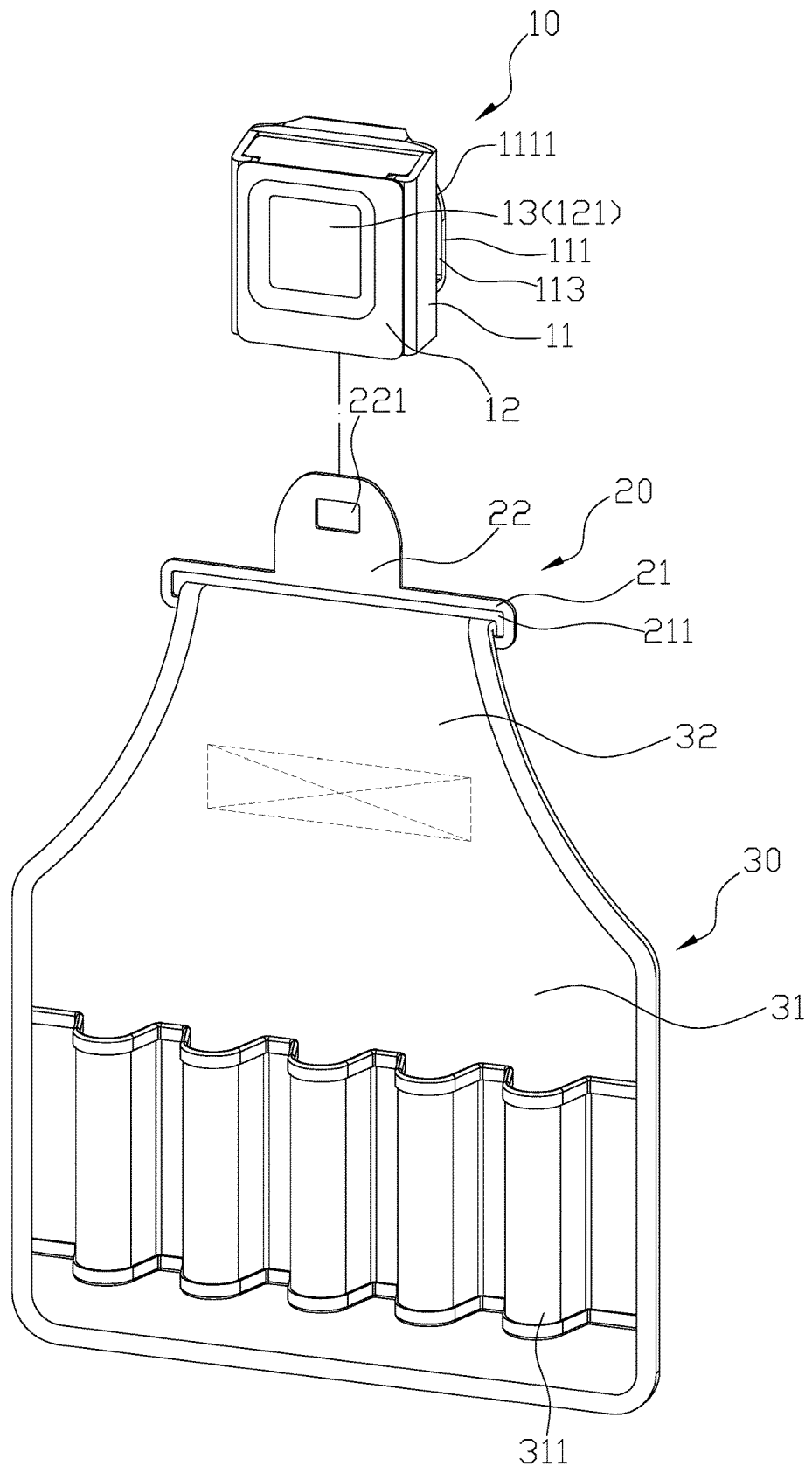
FIG. 2 is an exploded view of the tool bag structure having a fastener of the disclosure.
Figure 3:
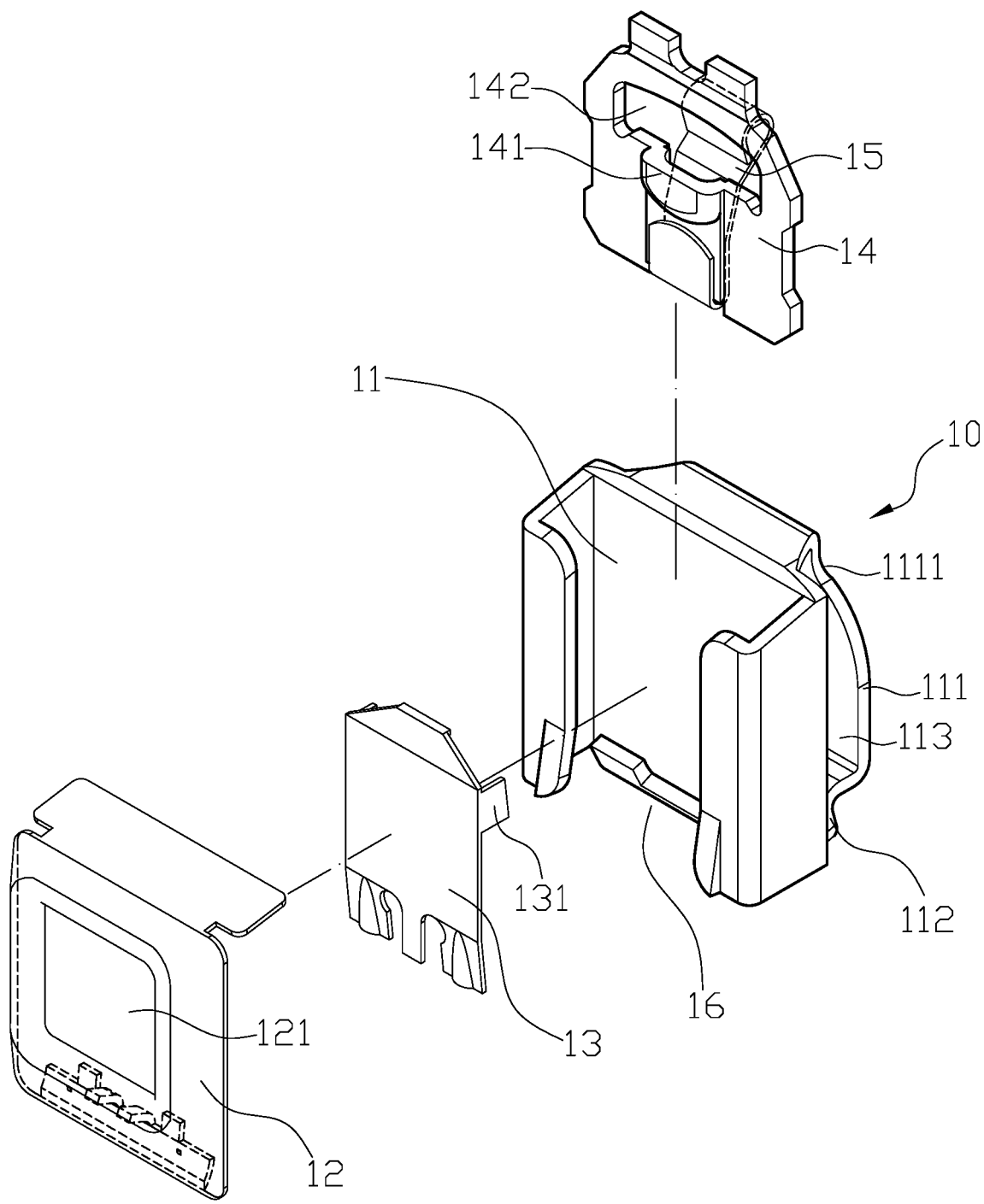
FIG. 3 is an exploded view of a fastener of the disclosure.
Figure 4:
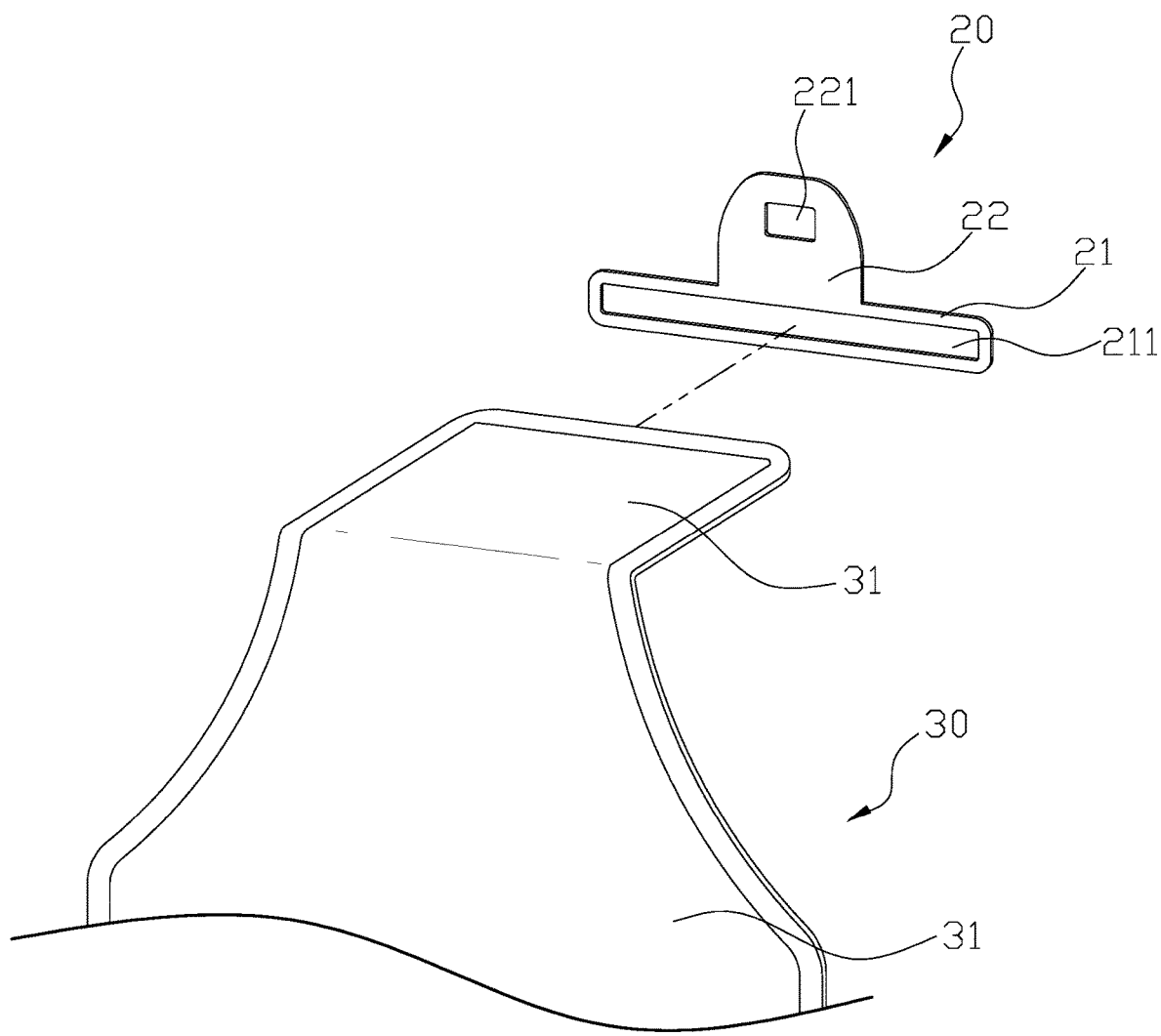
FIG. 4 is a first schematic view of a fastener accessory and a tool bag fitted together according to the disclosure.

Objectives, features, and advantages of the disclosure are herein illustrated with specific embodiments, depicted with drawings, and described below.

As shown in FIG. 1 through FIG. 10, the disclosure provides a tool bag structure having a fastener, comprising a fastener (10), a fastener accessory (20) and a tool bag (30). The fastener (10) has a fastener body (11). The back of the fastener body (11) extends and bends to form an n-shaped penetrating-fitting portion (111) through a sheet metal forming technique. The top surface of the penetrating-fitting portion (111) is parallel to or higher than the top surface of the fastener body (11). The free end of the penetrating-fitting portion (111) curves upward to form a pressing-through portion (112), allowing an enclosed penetrating-fitting slot (113) to be formed between the penetrating-fitting portion (111) and the fastener body (11). Each of two edges of the penetrating-fitting portion (111) is concave to define a guiding slot (1111). The penetrating-fitting slot (113) of the fastener (10) can contain a band (40) penetratingly fitted to the penetrating-fitting slot (113). The front surface of the fastener body (11) is fitted to a front cover (12) for masking the top surface and the front side of the fastener body (11). The front of the front cover (12) is higher than the back of the front cover (12). A compression prevention hole (121) penetrates the front cover (12). A downward-pressing element (13) is disposed below the front cover (12). The surface of the downward-pressing element (13) abuts against the bottom of the compression prevention hole (121). An edge of the downward-pressing element (13) extends to form at least one downward-pressing tab (131). A snap-latching portion (14) is disposed at the bottom of the fastener body (11). A resilient portion (15) is disposed between the snap-latching portion (14) and the fastener body (11) and adapted to resiliently push and cause the snap-latching portion (14) to abut against the downward-pressing tab (131). The surface of the snap-latching portion (14) is elevated to form a snap-latching protrusion (141). A gap is defined between the bottom of the fastener body (11) and the bottom of the front cover (12) to form an insertion hole (16) for insertion.

The fastener accessory (20) has a fitting portion (21). The fitting portion (21) is centrally provided with a fitting hole (211). The fitting portion (21) extends to form a snap-latching tab (22). The snap-latching tab (22) has a snap-latching hole (221). The snap-latching tab (22) is inserted into the fastener (10) via the insertion hole (16) to push the snap-latching portion (14), and thus the snap-latching protrusion (141) is snap-engaged inside the snap-latching hole (221), allowing the fastener (10) and the fastener accessory (20) to be fitted together.

Figure 5:
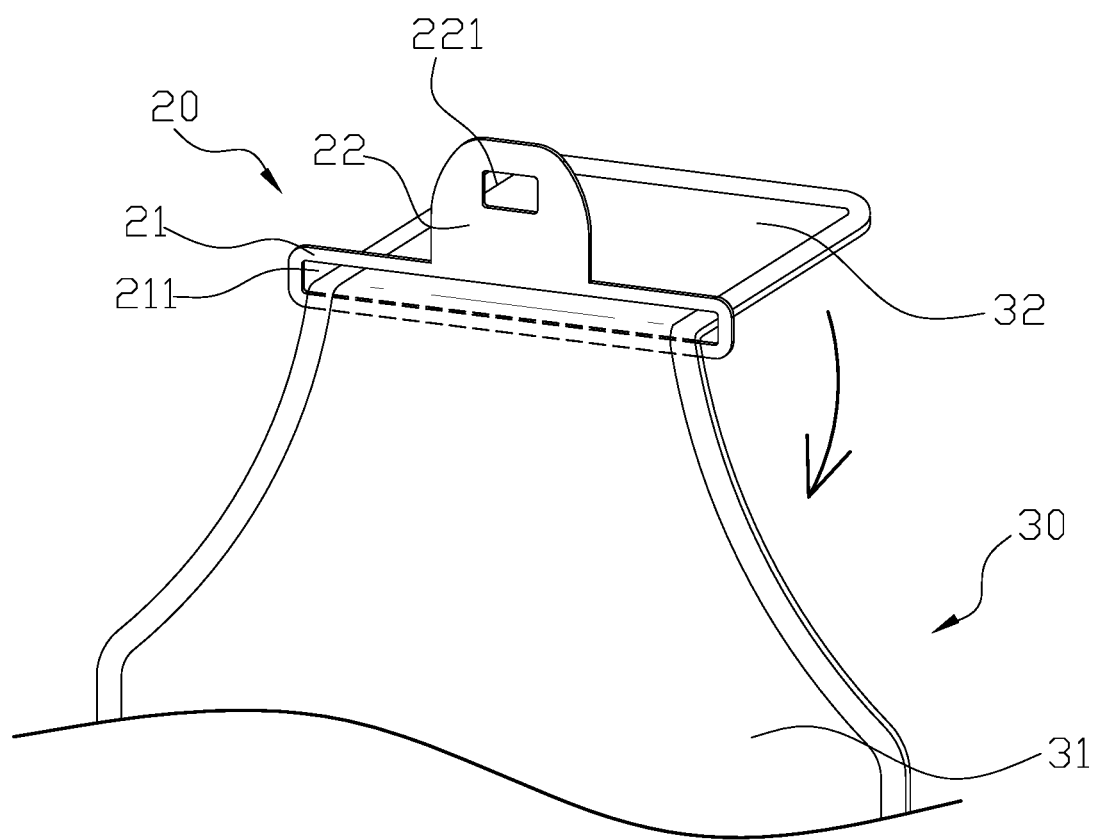
FIG. 5 is a second schematic view of the fastener accessory and the tool bag fitted together according to the disclosure.
Figure 6:
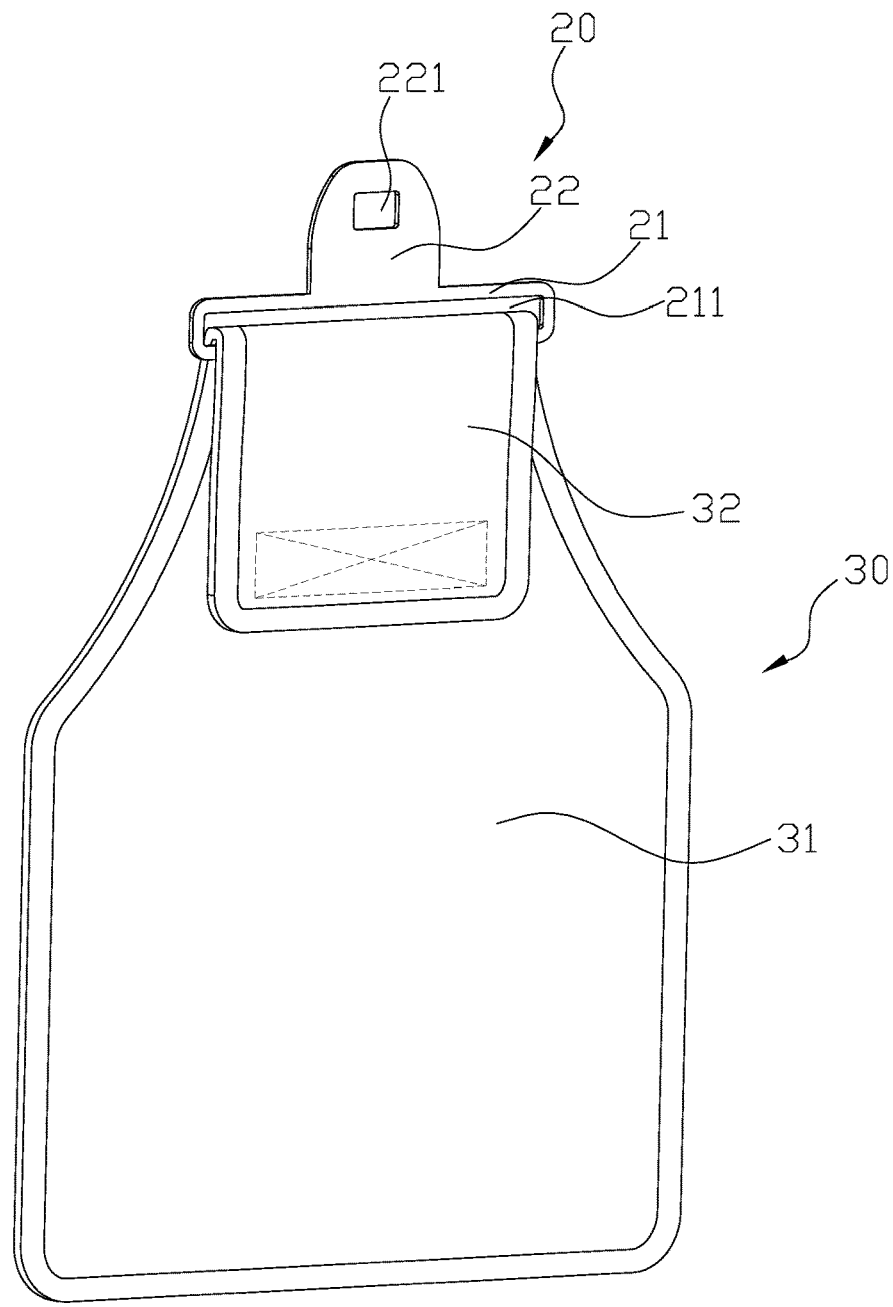
FIG. 6 is a perspective view of the fastener accessory and the tool bag fitted together and viewed from another angle according to the disclosure.

As shown in FIG. 5 and FIG. 6, the tool bag (30) has a tool bag body (31). The tool bag body (31) has a plurality of containing units (311) for containing tools. The upper edge of the tool bag body (31) extends to form a coupling edge (32). The fitting hole (211) and the fitting portion (21) form an enclosed ring-shaped structure. The coupling edge (32) is passed through the fitting hole (211) and folded so as to be coupled to the back surface of the tool bag body (31), allowing the fastener accessory (20) and the tool bag (30) to be fitted together.

Figure 7:
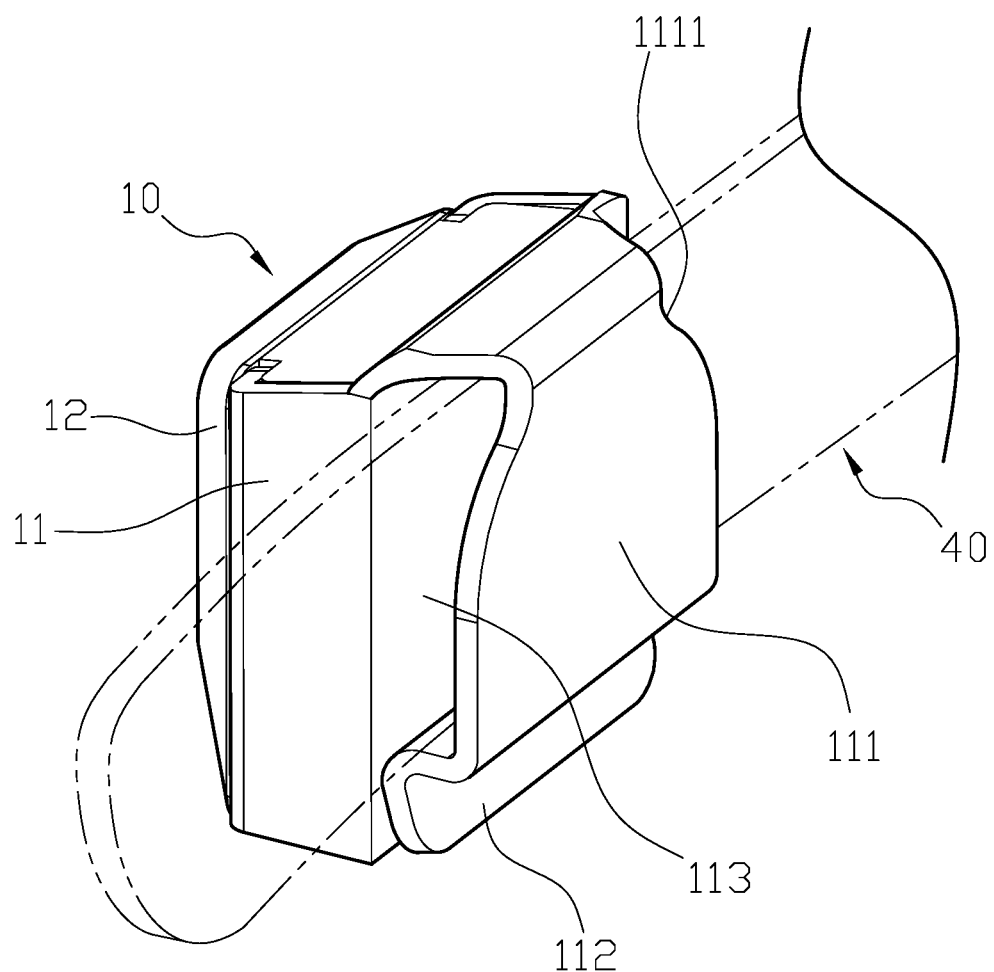
FIG. 7 is a schematic view of the fastener and a band fitted together in one aspect according to the disclosure.
Figure 8:
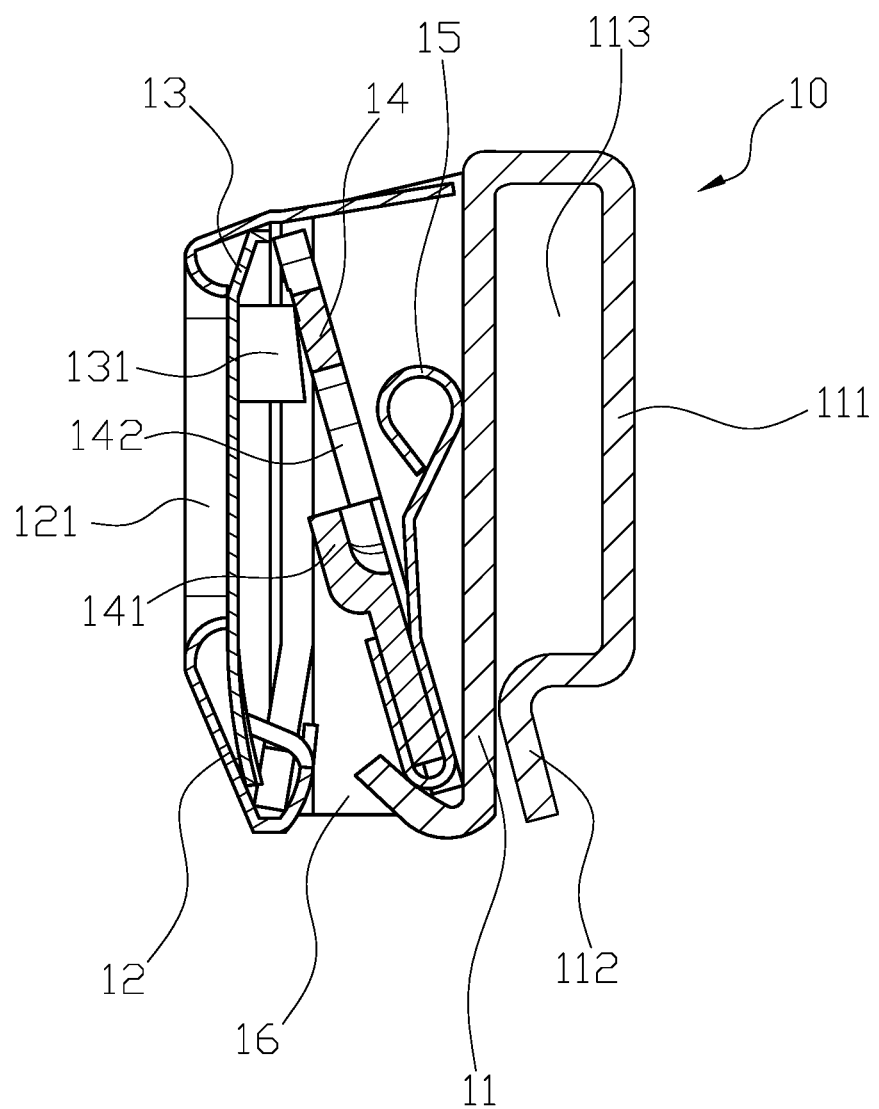
FIG. 8 is a schematic view of the fastener and the tool bag fitted together according to the disclosure.
Figure 9:
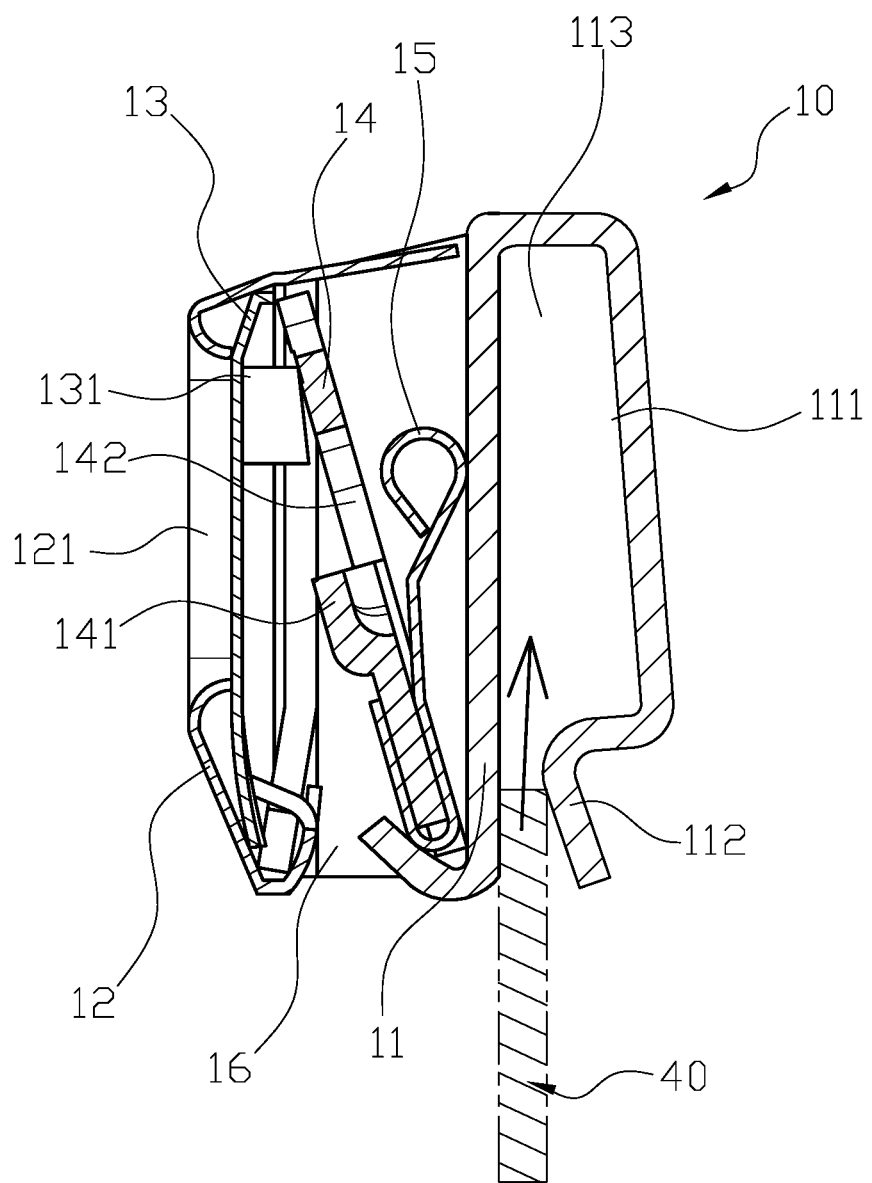
FIG. 9 is a schematic view of the fastener detached from the tool bag according to the disclosure.

FIG. 7 depicts the process flow of mounting the band (40) on the fastener (10). As shown in the diagram, the band (40) is moved from the fastener (10) laterally and inserted into the penetrating-fitting slot (113), allowing the fastener (10) to be mounted on the band (40). Since each of two edges of the penetrating-fitting portion (111) is concave to define a guiding slot (1111), the band (40) can be easily inserted into the penetrating-fitting slot (113) laterally while its insertion into the penetrating-fitting slot (113) is being guided by the guiding slot (1111). As shown in FIG. 8 and FIG. 9, the band (40) may also be inserted into the gap between the pressing-through portion (112) and the fastener body (11) to press the fastener (10) downward and thus cause the penetrating-fitting portion (111) to be temporarily bent outward, allowing the band (40) to enter the penetrating-fitting slot (113).

As shown in FIG. 8, the disclosure provides a tool bag structure having a fastener, wherein the snap-latching portion (14) has a through hole (142) positioned above the snap-latching protrusion (141) and adapted to receive the resilient portion (15) while receiving the front end of the snap-latching tab (22) or pressing the snap-latching portion (14) downward.

Figure 10:
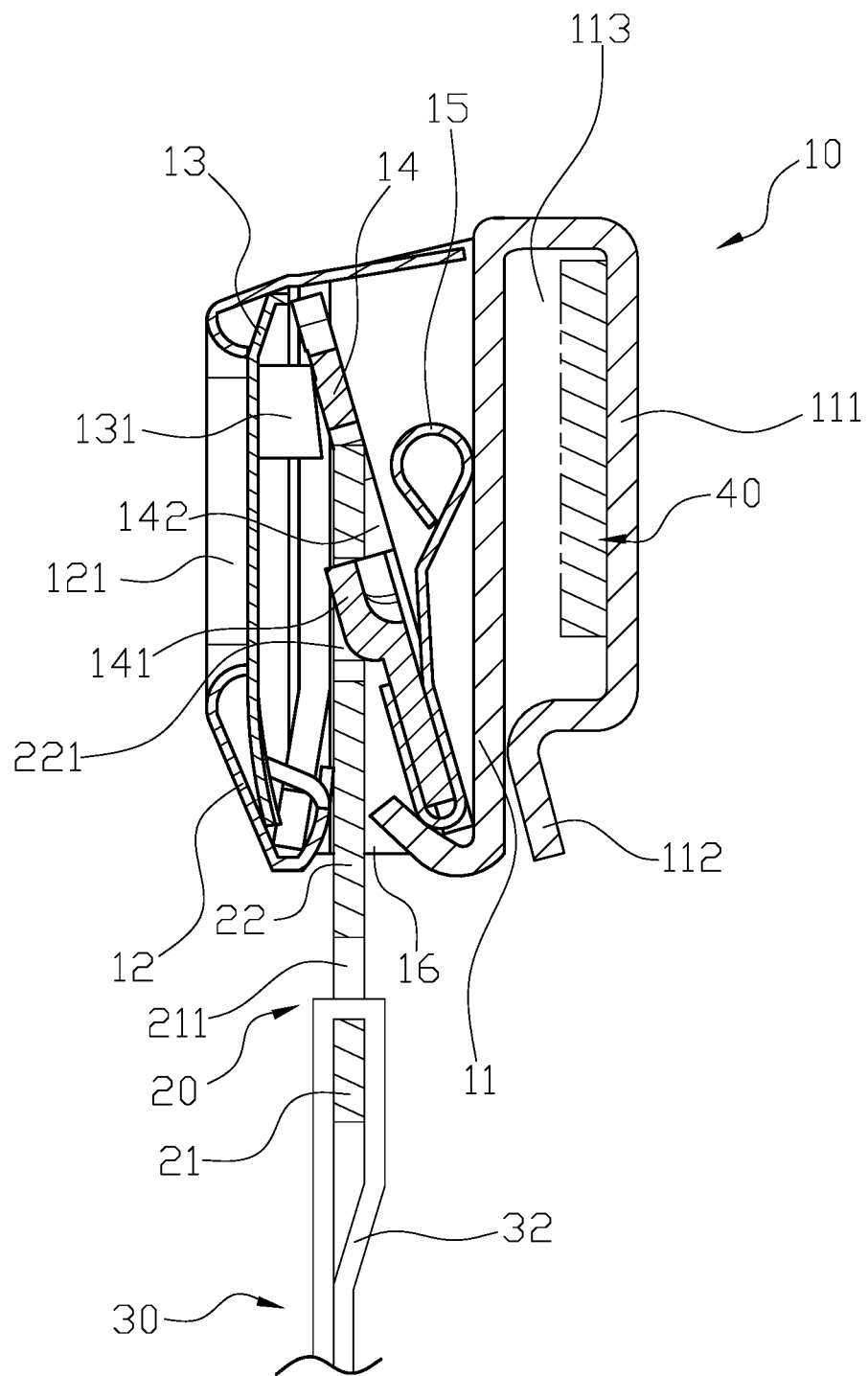
FIG. 10 is a schematic view of a penetrating-fitting portion bent according to the disclosure.
Figure 11:
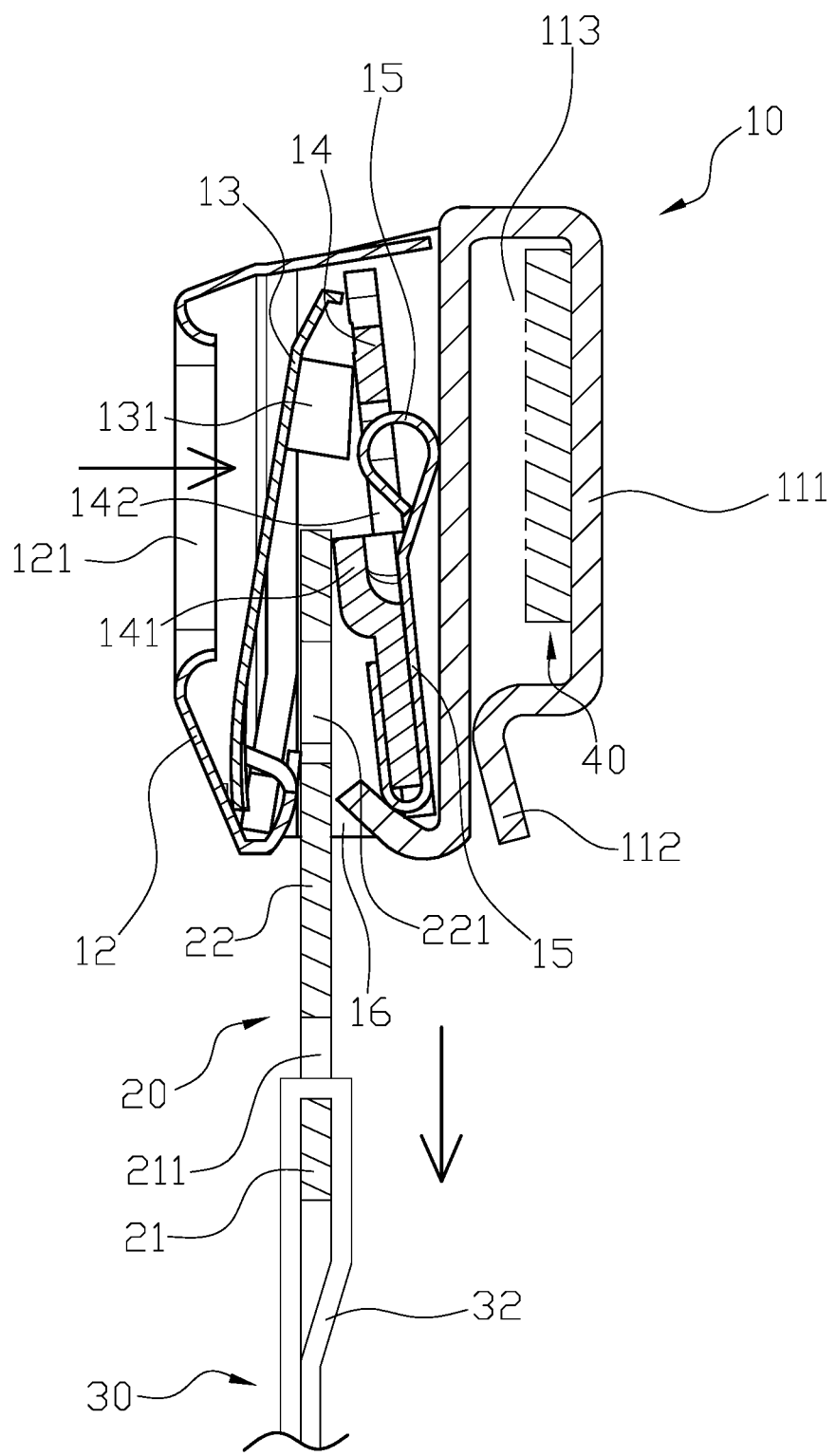
FIG. 11 is a schematic view of the penetrating-fitting portion, pressing-through portion, and penetrating-fitting slot according to the disclosure.

FIG. 10 depicts the process flow of mounting the fastener accessory (20) on the fastener (10). As shown in the diagram, a fastener accessory (20) can be mounted on the fastener (10) and has a snap-latching tab (22). The snap-latching tab (22) has a snap-latching hole (221). After the snap-latching tab (22) has been inserted into the fastener (10) via the insertion hole (16), the snap-latching tab (22) presses against the snap-latching protrusion (141) temporarily. When the snap-latching hole (221) passes over the snap-latching protrusion (141) to stop the snap-latching tab (22) from pressing against the snap-latching protrusion (141), the resilient portion (15) resiliently pushes the snap-latching portion (14) to cause the snap-latching protrusion (141) to be snap-engaged inside the snap-latching hole (221), allowing the fastener (10) and the fastener accessory (20) to be fitted together. As shown in FIG. 11, the process of separating the fastener accessory (20) from the fastener (10) only involves pressing the downward-pressing element (13), using the downward-pressing tab (131) to press against the snap-latching portion (14) to counteract the resilient force. Thus, the snap-latching protrusion (141) is temporarily detached from the snap-latching hole (221) to allow the snap-latching tab (22) to be withdrawn from the fastener (10) so as to achieve the purpose of fastening and unfastening the fastener accessory (20) quickly and achieve the snap-latching function through the fastener (10).

Concisely speaking, the disclosure provides a fastener structure for use with a band, wherein a fastener accessory (20) is mounted on the fastener (10) and has a snap-latching tab (22). The snap-latching tab (22) has a snap-latching hole (221) that penetrates the snap-latching tab (22). Under a resilient force of the resilient portion (15), the snap-latching protrusion (141) is snap-engaged fixedly inside the snap-latching hole (221) through the snap-latching portion (14), allowing the fastener (10) and the fastener accessory (20) to be fitted together.

Figure 12:
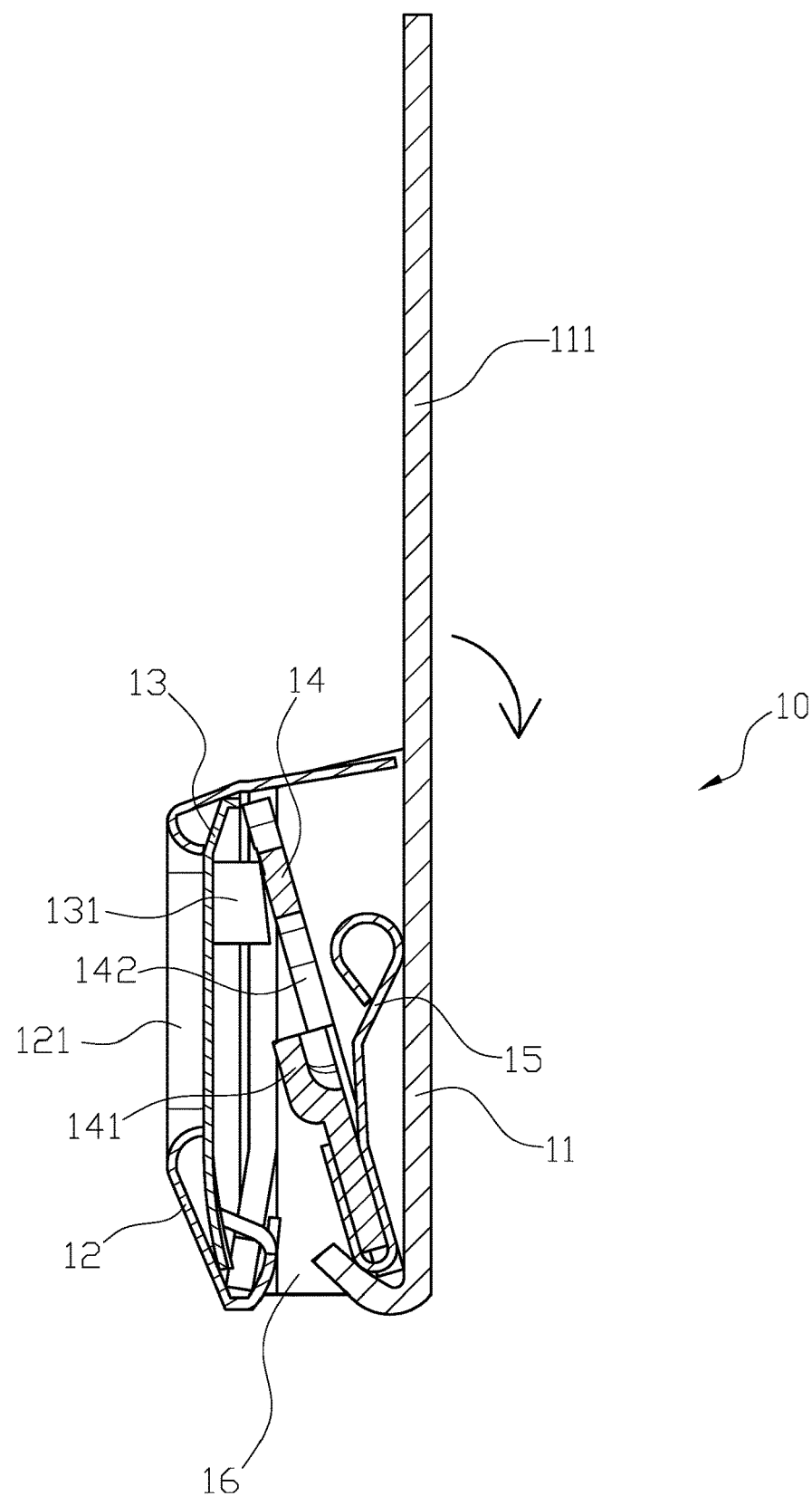
FIG. 12 is a lateral cross-sectional view of the fastener of the disclosure.
Figure 13:
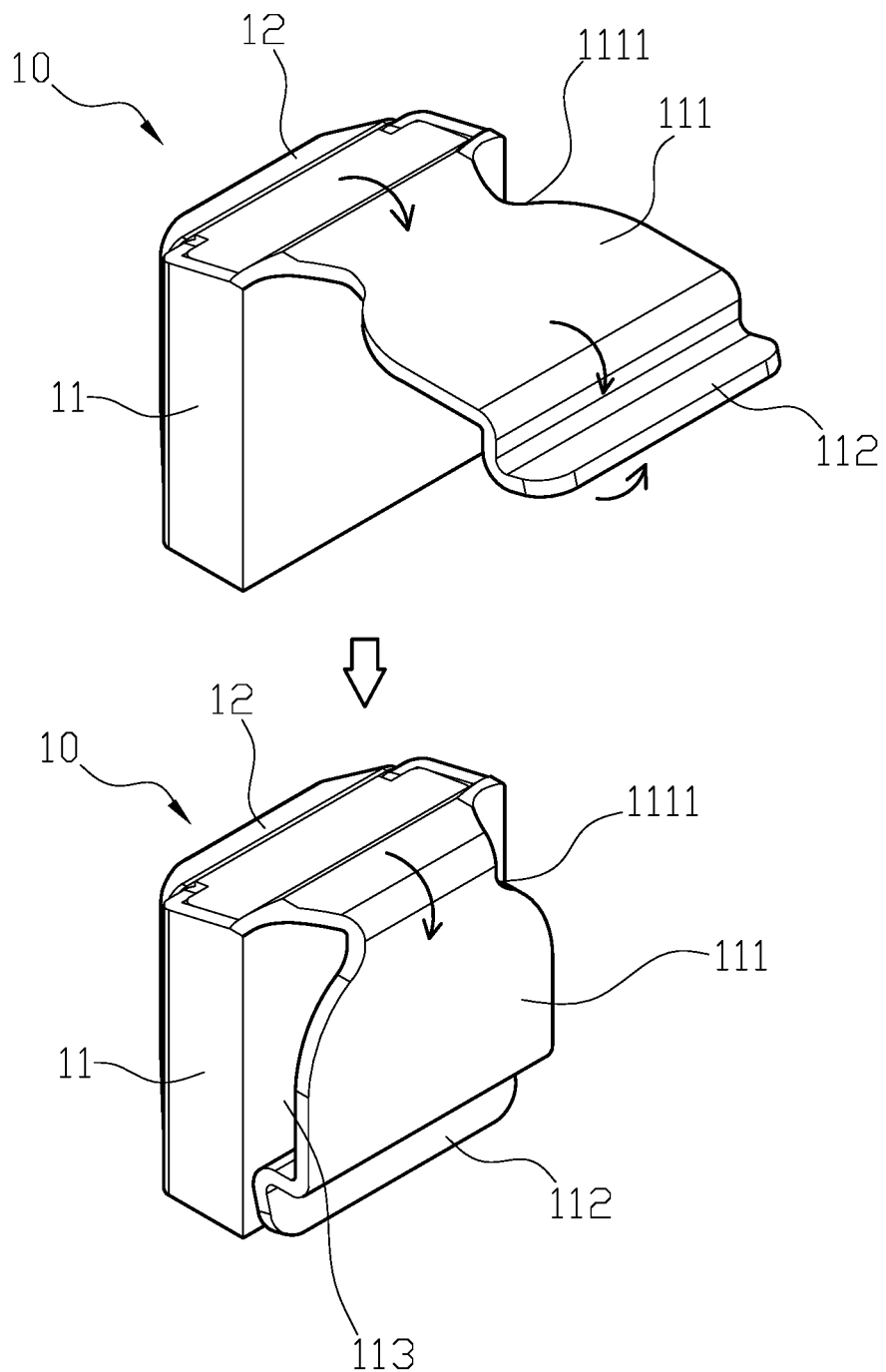
FIG. 13 is a schematic view of the fastener and the band fitted together in another aspect according to the disclosure.
Figure 14:
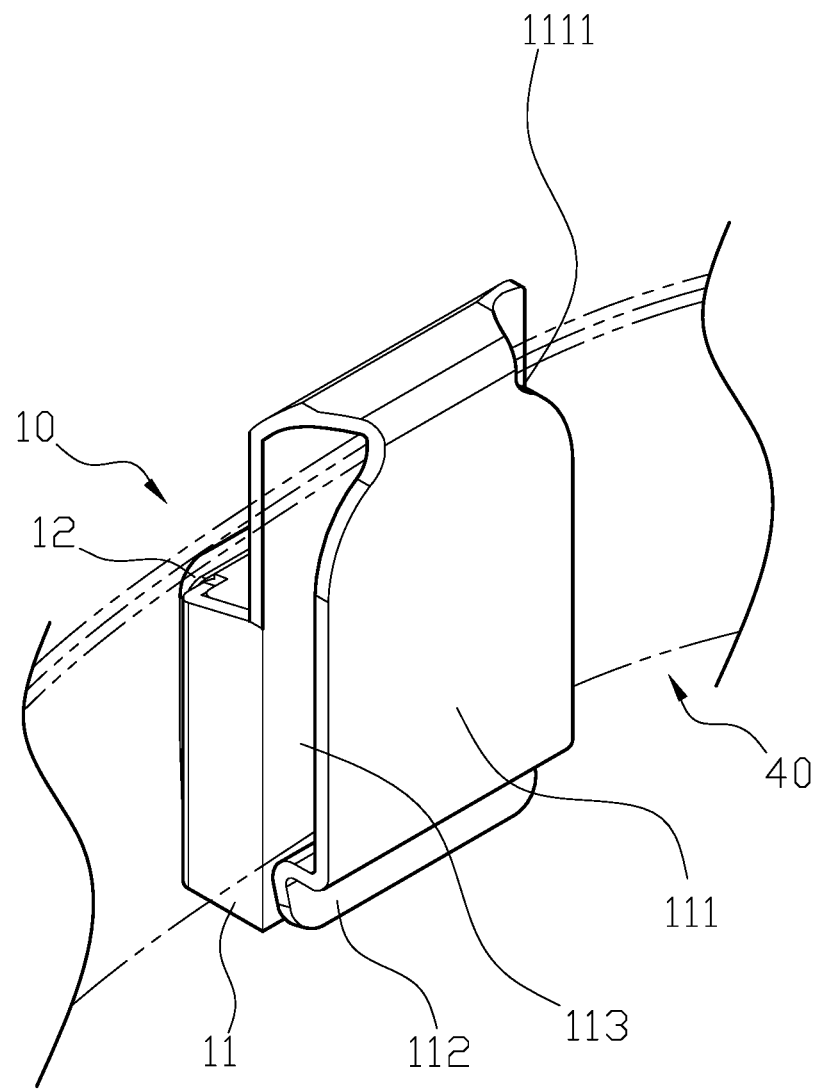
FIG. 14 is a perspective view of the penetrating-fitting portion in another aspect according to the disclosure, showing that the penetrating-fitting slot is large.
Figure 15:
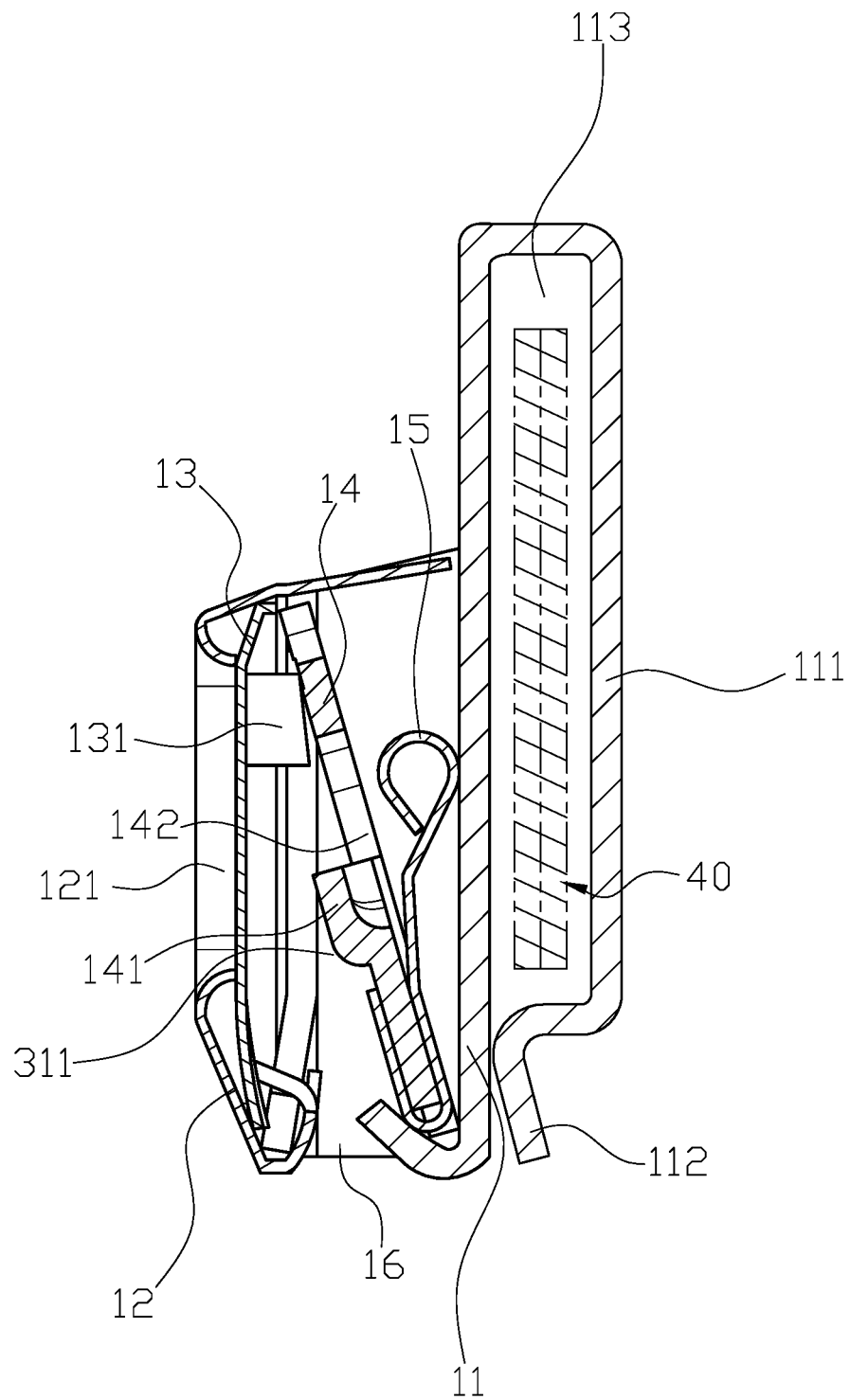
FIG. 15 is a lateral cross-sectional view of the penetrating-fitting portion in another aspect according to the disclosure, showing that the penetrating-fitting slot is large.

As shown in FIG. 12 and FIG. 13, the back of the fastener body (11) extends and bends to form the n-shaped penetrating-fitting portion (111) through a sheet metal forming technique. Thus, as shown in FIG. 14 and FIG. 15, the top surface of the penetrating-fitting portion (111) is parallel to or higher than the top surface of the fastener body (11). Therefore, the penetrating-fitting slot (113) can be adjusted in terms of its height and size to contain the band (40) of different widths to meet more user needs. In this aspect, the band (40) is a belt or S waist belt.

Figure 16:
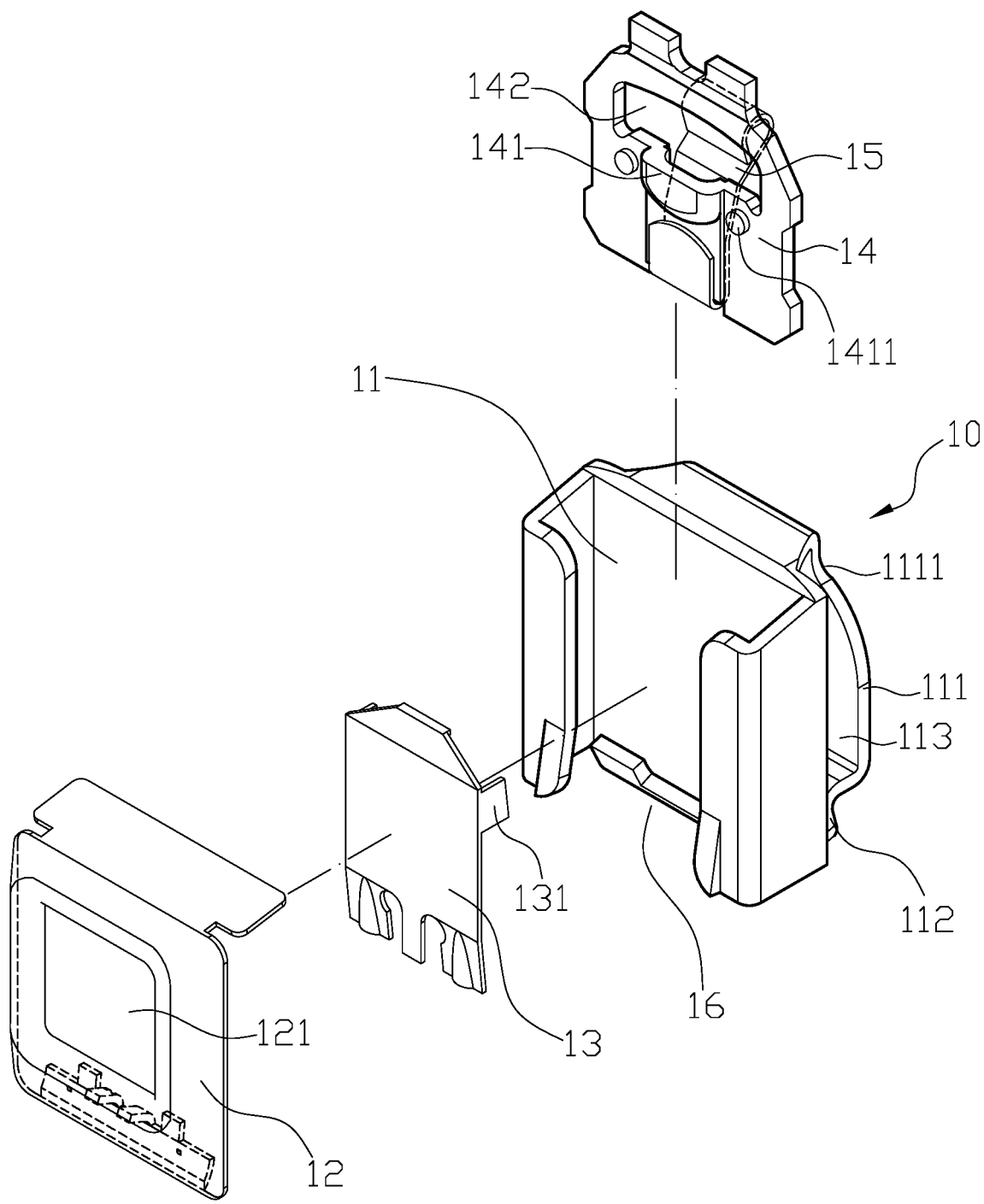
FIG. 16 is an exploded view of the fastener in another aspect according to the disclosure.
Figure 17:
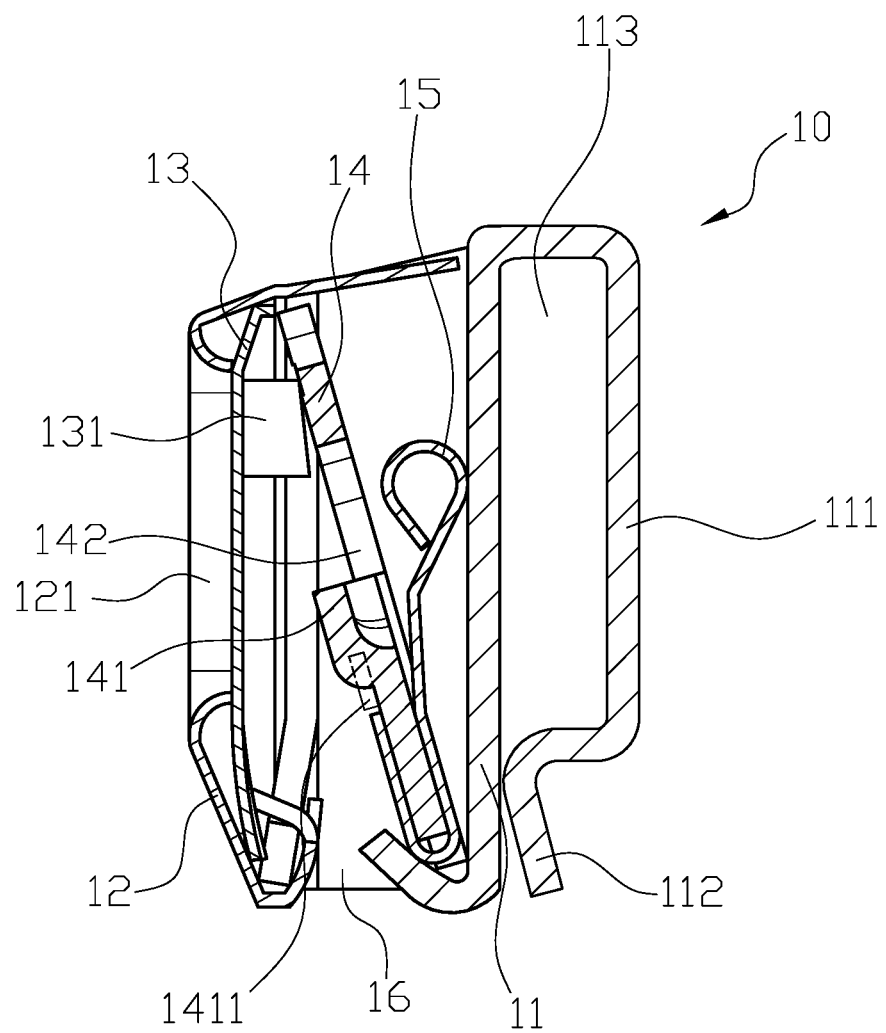
FIG. 17 is a lateral cross-sectional view of the fastener in another aspect according to the disclosure.

As shown in FIG. 16 and FIG. 17, the disclosure provides a tool bag structure having a fastener, wherein two bumps (1411) flanking the snap-latching protrusion (141) are disposed on the snap-latching portion (14). When the snap-latching protrusion (141) is snap-engaged inside the snap-latching hole (221), the two edges of the snap-latching tab (22) are restrained by the bumps (1411) respectively, preventing the fastener accessory (20) from shaking.

As shown in FIG. 18 through FIG. 21, in another aspect of the fastener accessory (20), the disclosure provides a tool bag structure having a fastener, wherein the fitting portion (21) further has an opening (212) in communication with the fitting hole (211). The coupling edge (32) is folded and coupled to the back surface of the tool bag body (31) before being laterally pressed and squeezed into the opening (212) to enter the fitting hole (211), allowing the fastener accessory (20) and the tool bag (30) to be fitted together. Therefore, the tool bag (30) can be replaced easily.

Figure 22:
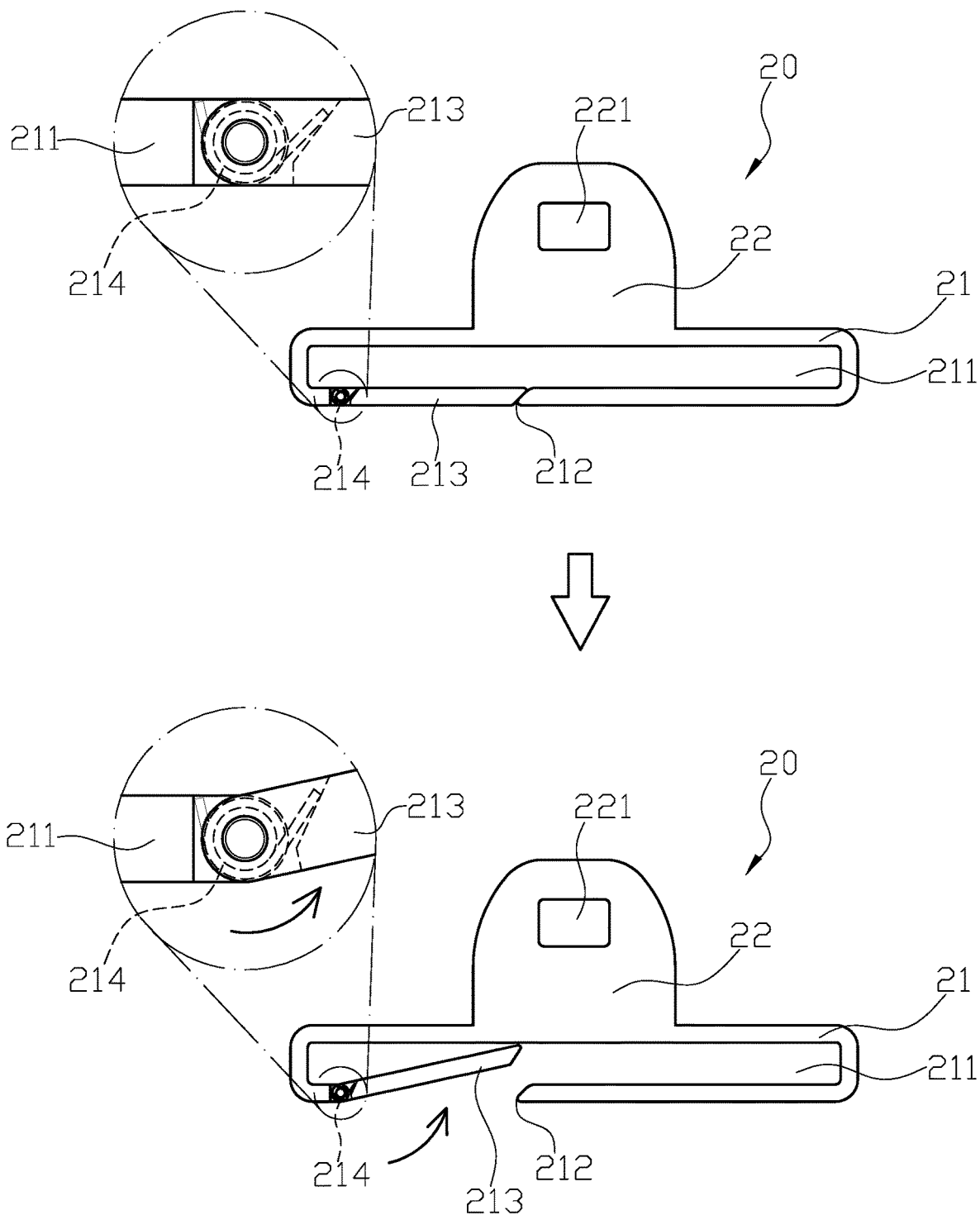
FIG. 22 is a schematic view of how to use the fastener accessory in yet another aspect according to the disclosure.

As shown in FIG. 22, in yet another aspect of the fastener accessory (20), the disclosure provides a tool bag structure having a fastener, wherein the opening (212) has a clasp (213) for closing the opening (212). A resilient element (214) is laterally disposed between the clasp (213) and the fitting portion (21). The clasp (213) is pushed to cause the coupling edge (32) to be laterally pressed and squeezed into the opening (212) to enter the fitting hole (211). When the clasp (213) is released, the clasp (213) rotates pivotally under a resilient force of the resilient element (214) to close the fitting portion (21) once again. Therefore, not only can the tool bag (30) be easily replaced, but the fastener accessory (20) and the tool bag (30) are also fitted together firmly.

As shown in FIG. 6, the disclosure provides a tool bag structure having a fastener, wherein the coupling edge (32) is coupled to the back surface of the tool bag body (31) by machine sewing.

Figure 18:
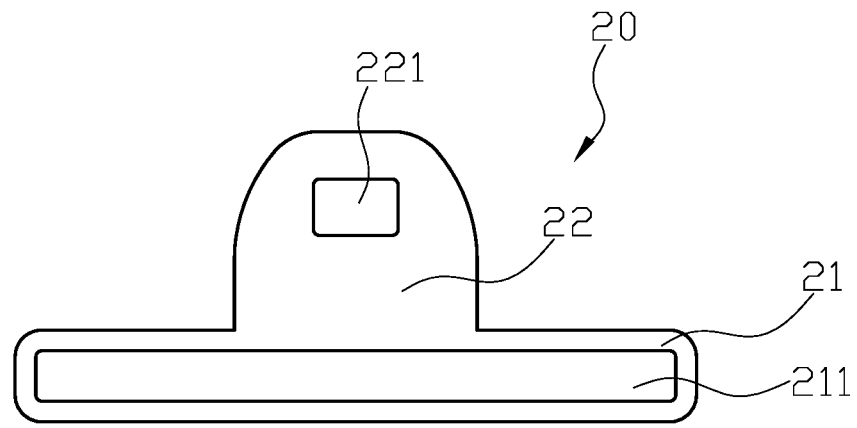
FIG. 18 is a comparative schematic view of the fastener accessory in another aspect according to the disclosure, showing the presence or absence of an opening.
Figure 18:
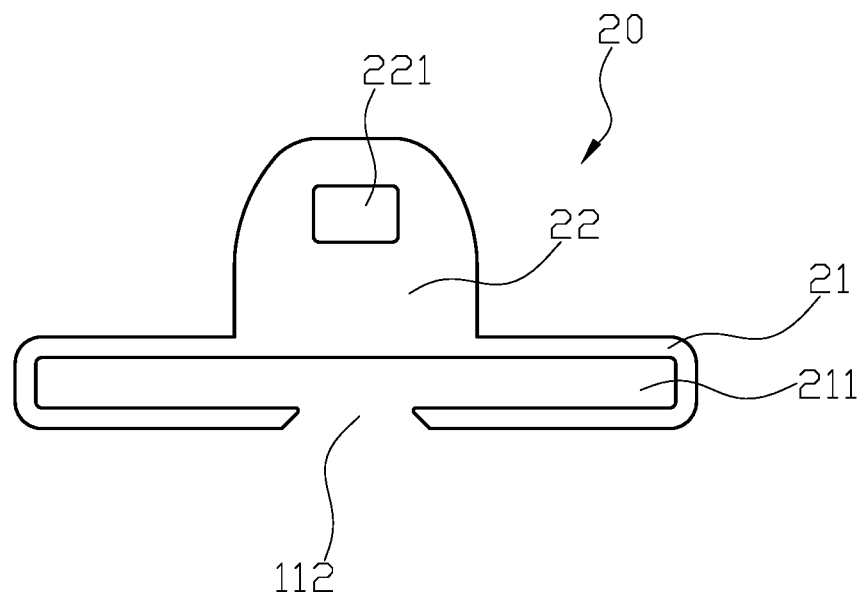
Figure 19:
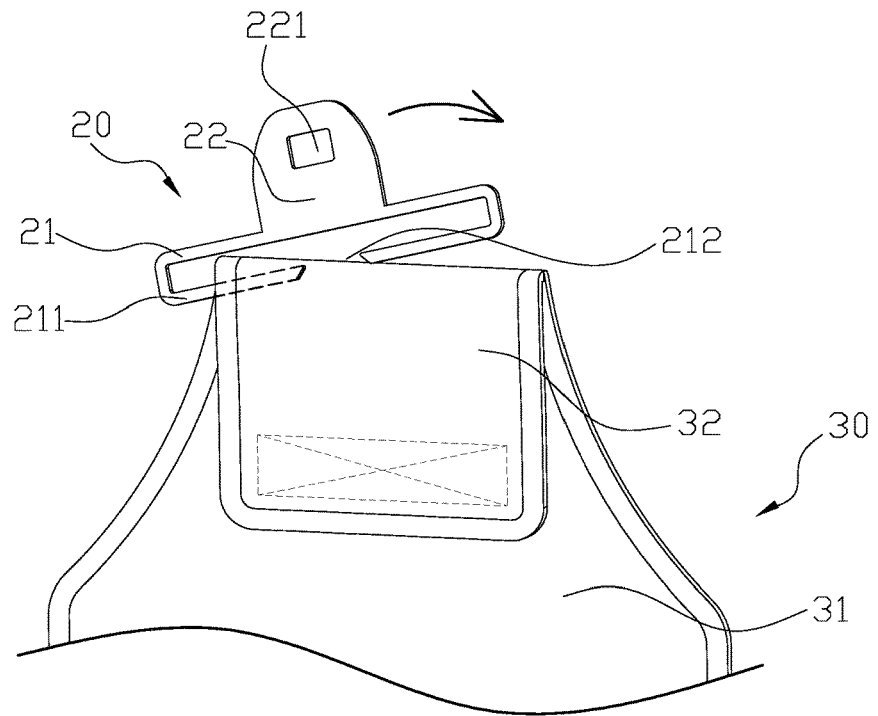
FIG. 19 is a first schematic view of the fastener accessory and the tool bag fitted together in another aspect according to the disclosure, showing that a coupling edge is laterally squeezed into an opening.
Figure 20:
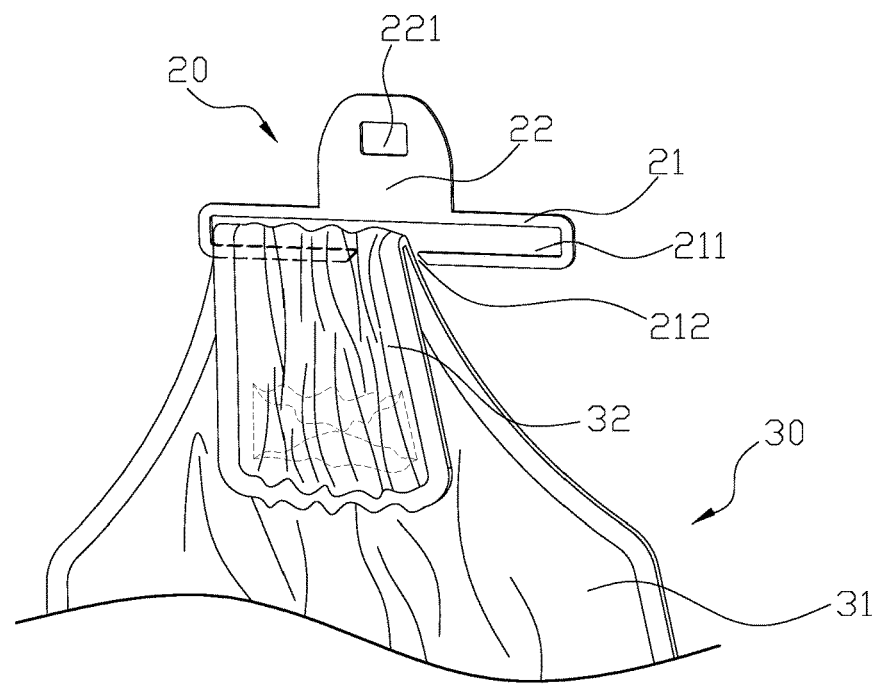
FIG. 20 is a second schematic view of the fastener accessory and the tool bag fitted together in another aspect according to the disclosure, showing that the coupling edge is laterally pressed and squeezed into the opening.
Figure 21:
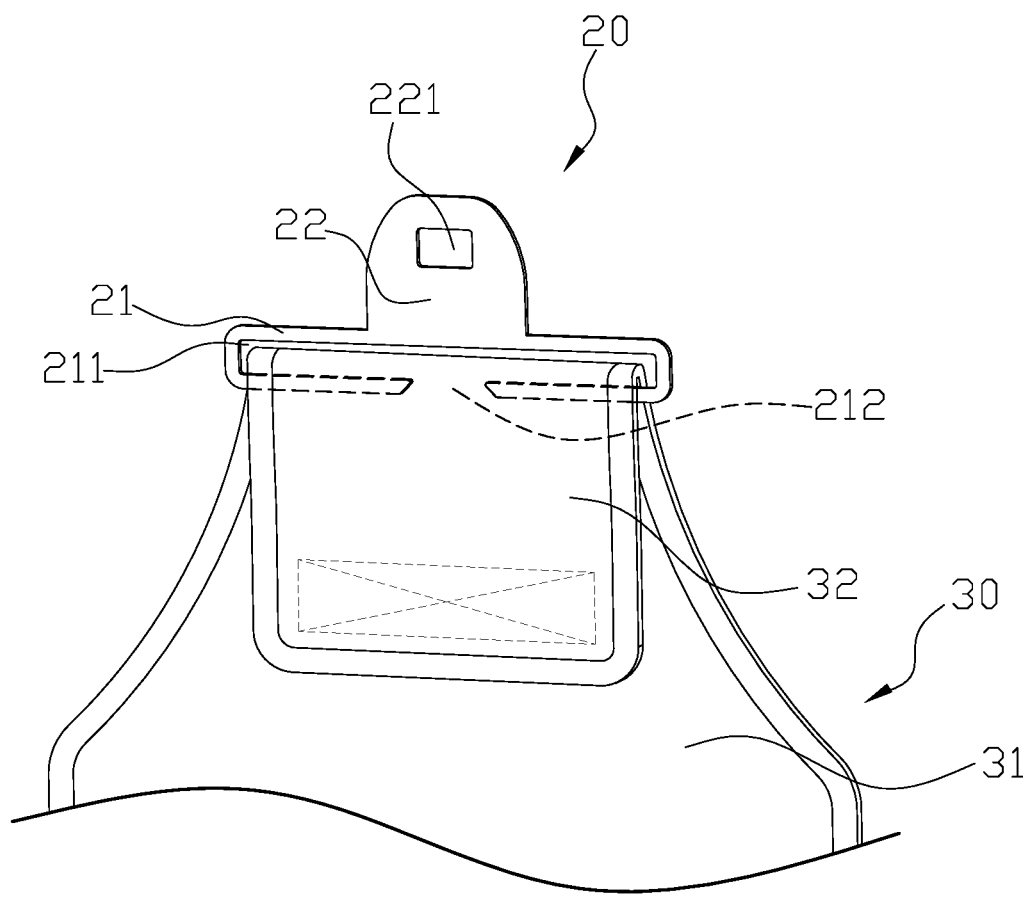
FIG. 21 is a third schematic view of the fastener accessory and the tool bag fitted together in another aspect according to the disclosure.

As shown in FIG. 18, the disclosure provides a tool bag structure having a fastener, wherein the opening (212) is located at the middle of the bottom of the fitting portion (21).

As shown in FIG. 22, the disclosure provides a tool bag structure having a fastener, wherein the opening (212) is located on the left or right of the bottom of the fitting portion (21).

Figure 23:
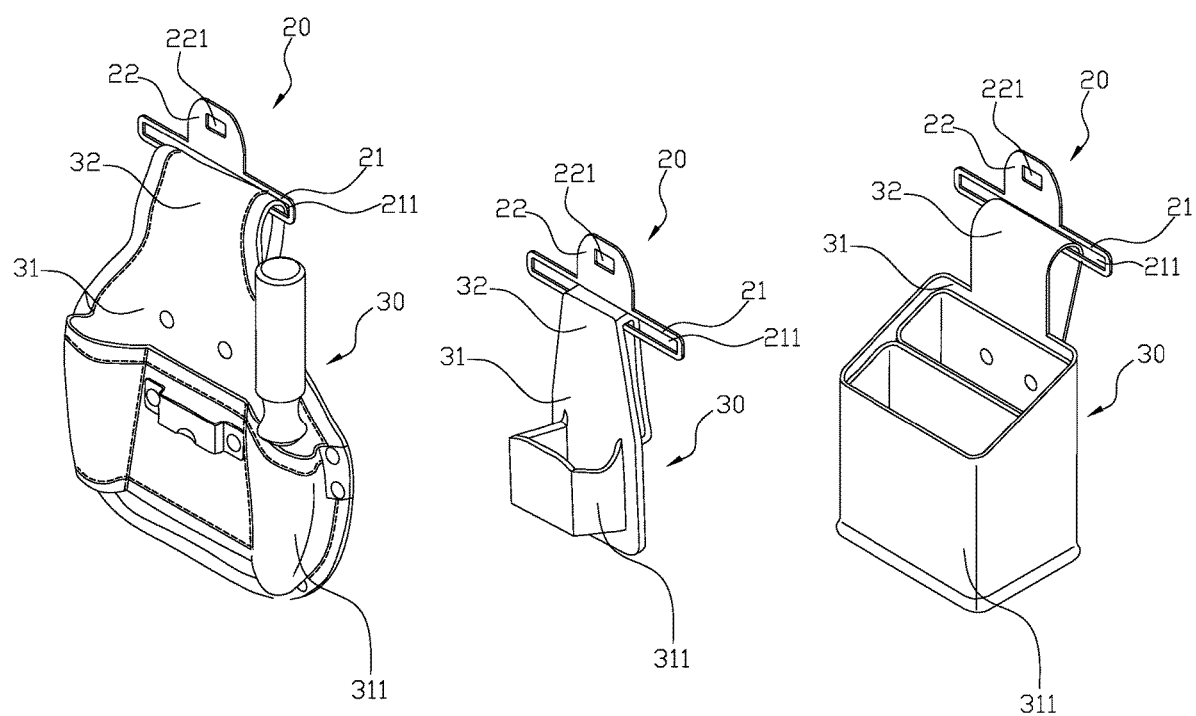
FIG. 23 is a schematic view of the tool bag in different aspects according to the disclosure.

As shown in FIG. 23, the disclosure provides a tool bag structure having a fastener, wherein the containing units (311) are ring-shaped structures penetrable by handled tools, such as hammers and screwdrivers, to be positioned in place.

As shown in FIG. 23, the disclosure provides a tool bag structure having a fastener, wherein the containing units (311) are bags for containing tools steadily.

As shown in FIG. 23, the disclosure provides a tool bag structure having a fastener, wherein the containing units (311) are boxes for containing tiny tools, such as screws.

Figure 24:
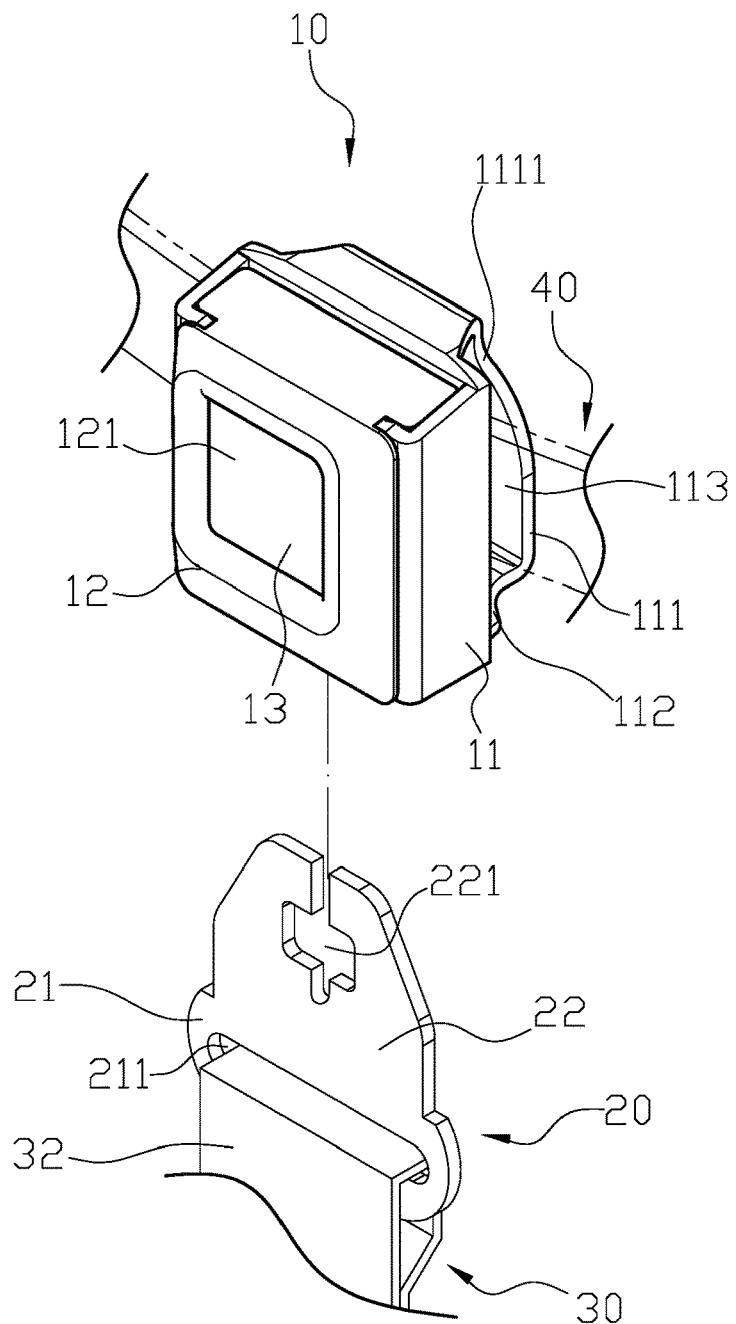
FIG. 24 is a schematic view of the fastener accessory fitted to the tool bag and provided in the form of a buckle in one aspect according to the disclosure.

As shown in FIG. 24, the disclosure provides a tool bag structure having a fastener, wherein the fastener accessory (20) is a buckle that can be replaced to meet user needs, whereas the coupling edge (32) is band-shaped, allowing the fastener accessory (20) to be fitted to the tool bag (30) and provided in the form of a buckle to broaden the scope of the application of the disclosure.

The fastener (10) can be combined with the fastener accessory (20) in many different shapes and with many different functions, provided that the snap-latching tab (22) of the fastener accessory (20) presses against the snap-latching protrusion (141) and has the snap-latching hole (221) which the snap-latching protrusion (141) is snap-engaged fixedly in to enable the fastener (10) to perform a quick snap-latching function and thereby engage with or disengage from the fastener accessory (20) quickly. The fastener accessory (20) can be connected to different objects, for example, a tool bag for carrying tools, or even connected to a jug or a safety device, to meet user needs. The fastener (10) functions as a pivot between the fastener accessory (20) and the band (40) and is conducive to frequent adjustment of the fastener accessory (20) without complete removal of the band (40), enhancing ease of use.

Owing to the aforesaid structural features, the tool bag structure having a fastener has advantages as follows:

1. The band (40) is moved from the fastener (10) laterally and inserted into the penetrating-fitting slot (113). The band (40) may also be inserted into the gap between the pressing-through portion (112) and the fastener body (11) to press the fastener (10) downward and thus cause the penetrating-fitting portion (111) to be temporarily bent outward, allowing the band (40) to enter the penetrating-fitting slot (113). Therefore, a user can fit the band (40) and the fastener (10) together easily.

2. Since each of two edges of the penetrating-fitting portion (111) is concave to define a guiding slot (1111), the band (40) can be easily inserted into the penetrating-fitting slot (113) laterally while its insertion into the penetrating-fitting slot (113) is being guided by the guiding slot (1111). Therefore, the user can fit the band (40) and the fastener (10) together easily.

3. Since the back of the fastener body (11) extends and bends to form the n-shaped penetrating-fitting portion (111) through a sheet metal forming technique, the top surface of the penetrating-fitting portion (111) is parallel to or higher than the top surface of the fastener body (11), allowing the penetrating-fitting slot (113) to be adjusted in terms of its height and size to contain the band (40) of different widths so as to meet user needs better.

The disclosure is disclosed above by a preferred embodiment. The embodiment is illustrative of the disclosure but shall not be interpreted as restrictive of the scope of the disclosure implemented. Thus, all equivalent variations and modifications made to the aforesaid embodiment according to the claims of the disclosure shall be deemed falling within the scope of the claims of the disclosure.

What is claimed is:

1. A tool bag structure having a fastener, comprising:

a fastener having a fastener body, the fastener body having a back extending and bending to form an n-shaped penetrating-fitting portion through a sheet metal forming technique, the penetrating-fitting portion having a top surface parallel to or higher than a top surface of the fastener body, the penetrating-fitting portion having a free end curving upward to form a pressing-through portion so as for an enclosed penetrating-fitting slot to be formed between the penetrating-fitting portion and the fastener body and adapted to contain a band penetratingly fitted to the penetrating-fitting slot, the penetrating-fitting portion having two edges each being concave to define a guiding slot, the fastener body having a front surface fitted to a front cover for masking the top surface and the front surface of the fastener body, the front cover having a front and a back, the front being higher than the back, the front cover being penetrated by a compression prevention hole, with a downward-pressing element disposed at a bottom of the front cover, the downward-pressing element having a surface abutting against a bottom of the compression prevention hole, the downward-pressing element extending to form at least a downward-pressing tab, with a snap-latching portion disposed at a bottom of the fastener body, with a resilient portion disposed between the snap-latching portion and the fastener body and adapted to resiliently push and cause the snap-latching portion to abut against the downward-pressing tab, wherein a surface of the snap-latching portion is elevated to form a snap-latching protrusion, and a gap is defined between the bottom of the fastener body and the bottom of the front cover to form an insertion hole for insertion;

a fastener accessory having a fitting portion, the fitting portion being centrally provided with a fitting hole and extending to form a snap-latching tab, the snap-latching tab having a snap-latching hole, wherein the snap-latching tab is inserted into the fastener via the insertion hole to push the snap-latching portion, and thus the snap-latching protrusion is snap-engaged inside the snap-latching hole, allowing the fastener and the fastener accessory to be fitted together; and a tool bag having a tool bag body with a plurality of containing units for containing tools, the tool bag body having an upper edge extending to form a coupling edge, with an enclosed ring-shaped structure formed by the fitting hole and the fitting portion, wherein the coupling edge is passed through the fitting hole and folded so as to be coupled to a back surface of the tool bag body, allowing the fastener accessory and the tool bag to be fitted together.

2. The tool bag structure having a fastener of claim 1, wherein the snap-latching portion has a through hole positioned above the snap-latching protrusion.

3. The tool bag structure having a fastener of claim 1, wherein two bumps flanking the snap-latching protrusion are disposed on the snap-latching portion.

4. The tool bag structure having a fastener of claim 1, wherein the fitting portion further has an opening in communication with the fitting hole, and the coupling edge is folded and coupled to the back surface of the tool bag body before being laterally pressed and squeezed into the opening to enter the fitting hole, allowing the fastener accessory and the tool bag to be fitted together.

5. The tool bag structure having a fastener of claim 4, wherein the opening has a clasp for closing the opening, with a resilient element laterally disposed between the clasp and the fitting portion, allowing the coupling edge to be laterally pressed and squeezed into the opening to enter the fitting hole when the clasp is pushed, allowing the clasp to rotate pivotally under a resilient force of the resilient element to close the fitting portion once again when the clasp is released.

6. The tool bag structure having a fastener of claim 1, wherein the coupling edge is coupled to the back surface of the tool bag body by machine sewing.

7. The tool bag structure having a fastener of claim 1, wherein the containing units are ring-shaped structures, bags or boxes.

* * * * *